Figure 2:
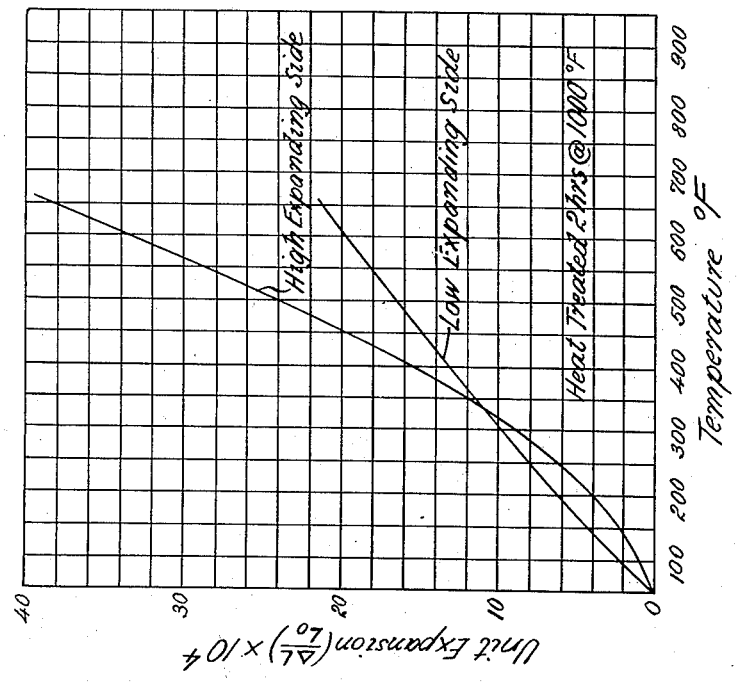

April 6, 1943.  R. G. WALTENBERG  2,315,565
BIMETALLIC ELEMENT
Filed Sept. 14, 1940   2 Sheets-Sheet 2

INVENTOR
Romaine G. Waltenberg
BY
ATTORNEY

Patented Apr. 6, 1943

2,315,565

UNITED STATES PATENT OFFICE 2,315,565

BIMETALLIC ELEMENT

Romaine George Waltenberg, Roselle, N. J., assignor to The H. A. Wilson Company, Newark, N. J., a corporation of New Jersey Application September 14, 1940, Serial No. 356,785

3 Claims. (Cl. 297—15)

This invention is concerned with thermally-responsive bimetals employed for determination or control of temperature or temperature change in heating devices and the like and aims to prolong the life of such bimetals in service at relatively elevated temperatures.

Thermally - responsive bimetals, hereinafter sometimes referred to simply as "bimetals," comprise two or more metal members (sometimes called "components" or "sides") having different rates of expansion under the influence of heat and joined together in a unitary structure that changes shape as it is heated or cooled. Thus, the bimetal may consist of dissimilar metal strips bonded together side by side. When such an element is heated, its two sides tend to expand unequally so that the bimetal bends in an arc.

Present day conditions of service for a bimetal frequently are such that it is subjected to high temperature for long periods. Thus, the bimetal may be maintained in or close to a source of heat, such as a pilot flame, and hence required to operate in a relatively high temperature range more or less continuously. Under such conditions, bimetals available heretofore have relatively short useful lives and are rendered useless by becoming permanently distorted or by failure of the bonds between members.

As a result of my investigations, I have developed thermally-responsive bimetals that are adapted to be maintained during service in a relatively high and broad temperature range and which have a prolonged useful life under such conditions. My invention contemplates a bimetal which may be subjected to high temperatures for long periods without acquiring permanent "set" and which comprises two metal members that expand at different rates upon heating, the rates of expansion of the two members being such that the bimetal has relatively slight deflection in one direction at temperatures below the operating range, substantially no deflection at a temperature in the neighborhood of the beginning, i. e., the lower limit, of said range and sharp deflection in the opposite direction at temperatures throughout said range. Hereinafter, the direction of the relatively slight deflection at low temperatures is considered to be negative while the sharp deflection in the operating range is considered as positive.

The behavior of the bimetal of my invention is due to the fact that the expansion of the first of its members is slightly less than the expansion of its second member at relatively low temperatures, substantially greater than the expansion of the second member at the relatively elevated temperatures of the operating range and the same as the expansion of the second member at an intermediate temperature. In other words, (considering the first member as "high expanding" and the second member as "low expanding") the rates of expansion of the members with temperature are variable and such that in a temperature range well below that at which the bimetal is to be maintained in service, the "low expanding" member expands to a slightly greater extent than the "high expanding" member with the result that the element is deflected slightly in a negative direction. However, as the temperature of the bimetal is raised, the rates of expansion of its members change so that the negative deflection diminishes and in the neighborhood of the lower limit of the operating range the expansion of both members is substantially the same. Then the bimetal is substantially undeflected and unstressed. As the temperature is raised still higher, the "high expanding" member comes into its own with a rate of expansion considerably greater than that of the "low expanding" member. Then the deflection of the bimetal is sharply positive.

Because the bimetal is substantially unstressed at a temperature in the neighborhood of the lower limit of the operating range for which it is designed, a low average stress is developed in the bimetal during service. This stress is substantially less than that developed in heretofore customary bimetals in the same service. The subjection of the bimetal to lower average stress during service, or the fact that the bimetal is deflected both negatively and positively during service as its temperature drops below or exceeds that at which it is undeflected, may account for the longer useful life of the bimetal. Whatever be the explanation, a bimetal having the characteristics set forth above may be maintained in service without acquiring a permanent set for longer periods in a temperature range extending upwardly from that at which the bimetal achieves an undeflected state (after having been deflected slightly in a negative direction).

Various pairs of metals, the rates of expansion of which are related to each other as described above, may be employed to form the respective sides of bimetals of my invention. The particular metals to employ will depend upon the temperature conditions to which the bimetal is to be subjected. However, for service at relatively elevated temperatures, say, in a range with a lower limit of 250° to 600° F., both sides of the bimetal advantageously are composed of "low expanding" nickel steels, i. e., steels containing a substantial proportion of nickel, of the order of 27% to 40%, and such that their coefficients of expansion at atmospheric temperature or thereabouts are small. The low expanding nickel steels employed to form the respective sides of the bimetal must be of different composition in order that their behavior with respect to each other upon heating shall be that described hereinbefore. It is, however, quite practicable to select two low expanding nickel steels the coefficients of expansion of which are so related to each other that the expansion of the first is slightly less than the expansion of the second at relatively low temperatures, substantially greater than the expansion of the second at relatively high temperatures and substantially the same as that of the second at an intermediate temperature. Several examples of such pairs of nickel steels are given hereinafter.

The essential relationship of the rates of expansion of the two nickel steel sides of the bimetal preferably is attained by including in the metal of the "low expanding" side a substantially higher proportion of cobalt than is contained in the other side. Preferably, cobalt is included in both sides. Thus, the "high" side may contain up to 2% cobalt when the "low" side contains from 10% to say 18% cobalt, the general rule being that if cobalt is present in both sides the proportion of cobalt present in the high side should be less than 2% and the proportion of cobalt present in the low side should be from 5 to 25 times the proportion of cobalt present in the high side and preferably should range from 10 to 18 per cent. It is, however, quite feasible to make nickel steel bimetals in accordance with my invention in which the high side contains no cobalt and several examples of such bimetals are given hereinafter. In any case, the proportion of cobalt to employ in high or low sides should be chosen with regard (1) to the type of service for which the bimetal is designed, and (2) the proportions of nickel present in the sides.

The sides of the bimetal may contain small proportions of alloy ingredients other than nickel, cobalt and iron. I have found that the addition of small proportions of molybdenum, say 0.9–3%, to the alloys of either or both sides improves the elasticity of the bimetal at elevated temperatures without altering the essential relationship between the rates of expansion of the sides. In the preferred nickel steel bimetal of my invention, both sides contain about 0.9–1.1% molybdenum.

The balance of the metal in the respective sides is principally iron, although usual impurities and alloying ingredients such as carbon, silicon, phosphorus and manganese can be tolerated in small proportions. The carbon content of the alloys of the sides should be less than .5% and preferably less than .2%. Silicon may be present in proportions up to .75% in either or both of the sides but preferably the proportions of this element are maintained at or below .15%. Manganese may be present in proportions up to .5%, but this element tends to increase rates of expansion of nickel steels at relatively low temperatures and should not be employed in proportions greatly exceeding .5%, even though improved workability of the alloys could thereby be attained. Alloying ingredients and impurities other than those mentioned above may be present in small proportions provided that they do not alter the essential relationship between the rates of expansion of the sides of the bimetal but, in general, the presence of such ingredients and impurities is to be avoided.

For service in a temperature range of about 300° F.–1000° F., which has proved to be unusually severe for bimetals available heretofore, the preferred bimetal of my invention comprises two nickel steel members both of which contain of the order of 30% nickel (say 27% to 33% Ni), and of the order of 1% molybdenum (say 0.9% to 1.1% Mo). The low expanding member contains a relatively large proportion of cobalt (of the order of 10–18%) and, preferably, the high expanding member contains a small proportion of cobalt (of the order of 1%). The balance is substantially iron, i. e., iron plus small proportions of usual constituents such as silicon, carbon and manganese.

As shown by the deflection curves (Fig. 4) discussed in detail hereinafter, the degree of negative deflection and the "intermediate" temperature at which zero deflection is obtained with nickel steel bimetals of my invention are dependent upon the proportions of nickel or cobalt, or both, present in the respective sides. The presence of cobalt in a nickel steel tends to increase the expansion thereof at relatively low temperatures and to decrease its expansion at relatively high temperatures, so that in the nickel steel bimetals of the type contemplated herein, an increase in the cobalt content of the low expanding side (other factors remaining the same) tends to increase the degree of negative deflection and the temperature at which zero deflection is attained. The nickel contents of the two sides of the bimetal, and, more particularly, the ratio of the nickel contents of the sides, also tend to influence the temperature of zero deflection. Generally speaking, an increase in the nickel content of the high expanding side, other conditions remaining the same, tends to increase the temperature of zero deflection. Therefore, other factors being equal, the temperature of zero deflection of the nickel steel bimetals of my invention may be increased, within limits (say, over a temperature range of 200° F. to 600° F.) by (1) increasing the nickel content of the high expanding side, or (2) increasing the nickel content or the cobalt content, or both, in the low expanding side.

Figure 1:
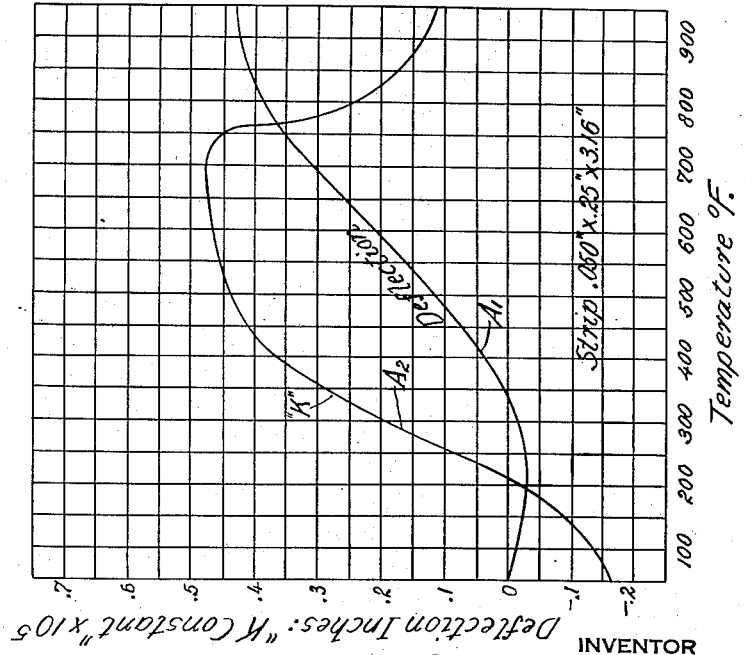
Figure 4:
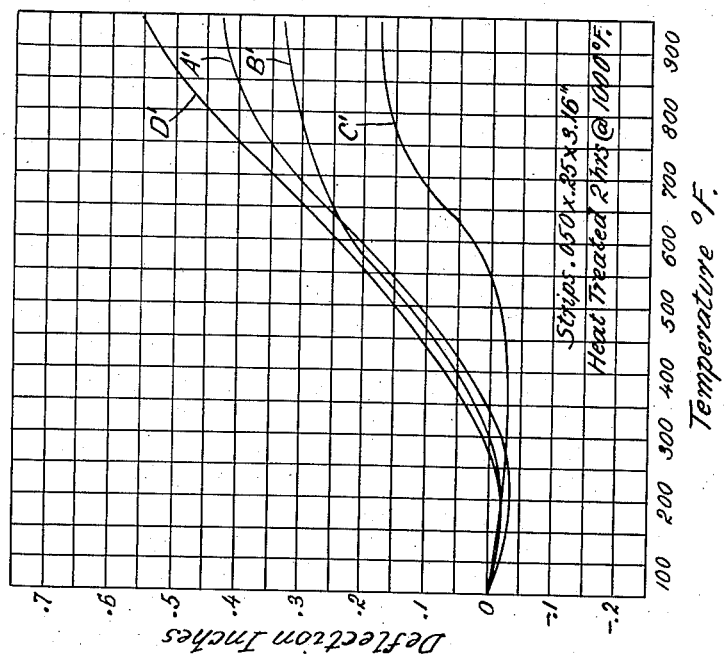
Figure 3:
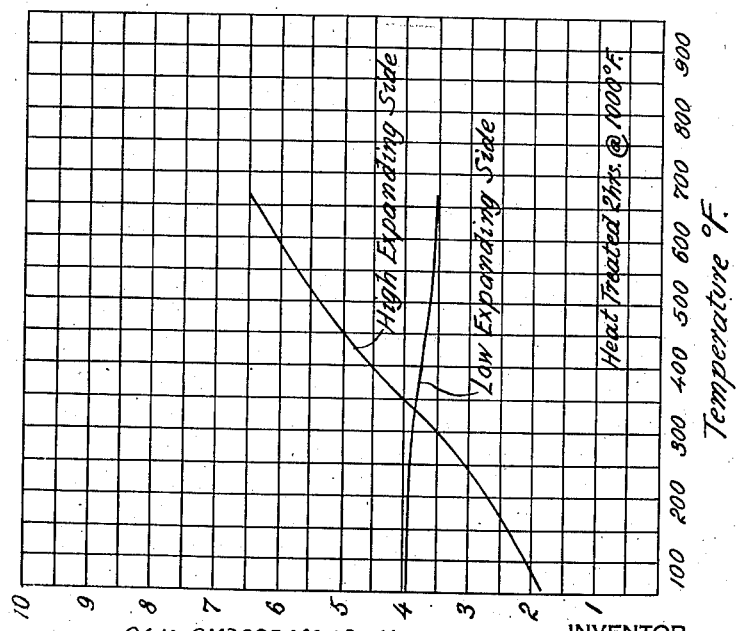

These and other aspects of my invention will be more thoroughly understood in the light of the following detailed description, taken in conjunction with the accompanying graphs of which:

Fig. 1 illustrates the behavior of a preferred bimetal A of my invention by means of a deflection curve and a K curve—deflection and K value, respectively, of the bimetal being plotted against temperature;

Fig. 2 has curves constructed by plotting unit expansion of the respective sides of bimetal A against temperature;

Fig. 3 has curves constructed by plotting mean expansion coefficients of the respective sides of bimetal A against temperature; and Fig. 4 illustrates the behavior of bimetal A and three other nickel steel bimetals of the invention (designated, respectively, as B, C and D) by means of deflection curves.

The bimetal A of my invention is intended for service in a temperature range of about 400° F. to about 800° F. Its two sides are nickel steels of which the following are preferred compositions:

| Constituents | High expanding side | Low expanding side |
|---|---|---|
| | Per cent | Per cent |
| Ni | 31.7 –32.3 | 31.7 –32.3 |
| Co | .90– 1.10 | 14.7 –15.3 |
| Mo | .90– 1.10 | 0.90– 1.10 |
| C | .12 max. | .12 max. |
| Si | .15 max. | .15 max. |
| Mn | .45 max. | .45 max. |
| Fe | Balance | Balance |

The behavior of a bimetal of the A type is illustrated on Fig. 1. The particular bimetal tested was a strip 0.050 inch thick, 0.25 inch wide and 3.16 inches long. Prior to test, the strip was heat-treated for two hours at 1000° F. The exact compositions of its respective sides were as follows:

| Constituents | High expanding side | Low expanding side |
|---|---|---|
|  | Per cent | Per cent |
| Ni | 31.82 | 31.87 |
| Co | 1.04 | 14.93 |
| Mo | 1.12 | 1.04 |
| C | .04 | .04 |
| Si | .21 | .21 |
| Mn | .38 | .32 |
| Fe | Balance | Balance |

Curve A1 on Fig. 1 was constructed by plotting the deflections of the bimetal A in inches against temperatures in degrees Fahrenheit at which the particular deflections occurred. The curve reflects the peculiarities of the bimetal A and is also characteristic of all the bimetals of my invention. Thus, the curve is first negative in slope and then positive, crossing the line of zero deflection and continuing in a positive direction at a relatively steep slope through the preferred operating range of the bimetal.

Referring to the curve, it will be observed that at or about atmospheric temperatures the deflection of bimetal A is substantially zero. A slight negative deflection is attained when the bimetal is heated above atmospheric temperatures, the negative deflection increasing until a temperature of about 200° F. is attained. This negative deflection is due to the fact that below about 200° F. the rate of expansion of the low expanding side is slightly in excess of the rate of the expansion of the high expanding side (see Figs. 2 and 3). As the temperature of the bimetal is raised above about 200° F., the negative deflection decreases from its maximum and becomes zero at about 340° F., for in the range of 240–340° F. the high expanding member expands at a somewhat higher rate than the low expanding member, total expansion of the respective members being substantially the same at 340° F. At temperatures above 340° F., deflection of the bimetal is sharply positive and increases at a more or less constant rate with temperature until 750–800° F. is reached, after which the rate of increase of deflection gradually diminishes.

The flexivity (F) of a bimetal, as defined by the American Society for Testing Materials, is the change in curvature per unit temperature per unit thickness. It is customary to consider flexivity in terms of a constant "K" which depends upon the differences in thermal expansion, in ratio of elastic moduli and in thickness of the components (sides) of the bimetals. The relationship between F and K and other factors is expressed by the equation:

$$F = 2K = \frac{\left(\frac{1}{R_2} - \frac{1}{R_1}\right)t}{T_2 - T_1}$$

where $R_1$ is the original radius of curvature of the bimetal at the original temperature $T_1$, $R_2$ is the radius of curvature of the bimetal after a change to temperature $T_2$ and $t$ is the total thickness of the bimetal.

It will be seen that flexivity or K is a measure of the sensitivity of a bimetal to temperature change at a given temperature level. Values for the K of the bimetal A at different temperatures are plotted on Fig. 1 as the curve A2. This curve, like the deflection curve A1, reflects the peculiarities of the bimetal A and also is characteristic of all of the bimetals of my invention. Thus, the values of K are negative and small below the temperature at which negative deflection attains its maximum (about 200° F. in the case of bimetal A) and positive at higher temperatures, reaching their maximum in the operating range (400–800° F. in the case of bimetal A). In other words, the bimetal has a slight negative flexivity at low temperatures, high positive flexivity in the operating range, and zero flexivity at an intermediate temperature.

Figs. 2 and 3 show how individual sides of the bimetal A tend to expand with temperature. The curves on these figures indicate why bimetals of the invention first deflect slightly in the negative direction, then attain zero deflection and finally deflect sharply in a positive direction as the temperature is raised. Thus, in Fig. 2 unit expansion $$\left(\frac{\Delta L}{L_0}\right)$$

of each member is plotted against the temperature responsible for the expansion, with the result that the curve for the "low expanding" member slopes gradually and relatively uniformly over a wide temperature range. The curve for the "high expanding" member, however, bends underneath the curve for the "low expanding" member until a temperature of about 340° F. is reached, at which point the unit expansions of the two are equal. At higher temperatures, the curve for the high expanding member is far above the curve for the low expanding member.

The deflection curve for the bimetal A is compared on Fig. 4 with deflection curves for three other nickel steel bimetals of my invention. In all cases, the bimetal strips represented by the deflection curves were .05 inch thick, .25 inch wide and 3.16 inches long and prior to test were heat-treated for two hours at 1000° F. Chemical analyses of the respective sides of the various bimetals represented on Fig. 4 are as follows:

| Bimetal | Side | Constituents, per cent | | | | | | |
|---|---|---|---|---|---|---|---|---|
|  |  | Ni | Co | C | Mn | Si | Mo | Cr |
| A | Low | 31.87 | 14.93 | .04 | .32 | .21 | 1.04 |  |
|  | High | 31.82 | 1.04 | .04 | .38 | .21 | 1.12 |  |
| B | Low | 27.50 | 14.27 | .08 | .47 | .24 |  |  |
|  | High | 32.95 |  | .10 | .65 | .12 |  |  |
| C | Low | 31.92 | 11.72 | .02 | .30 | .04 |  |  |
|  | High | 39.39 |  | .07 | .43 | .11 | 1.10 |  |
| D | Low | 31.82 | 16.14 | .02 | .16 | .05 |  |  |
|  | High | 31.80 |  | .04 | .39 | .13 | .91 | .97 |

In all cases, substantially all of the balance of the alloy is iron plus small proportions of impurities which do not alter the essential character of the alloys substantially.

From the foregoing table it will be observed (1) that both high and low sides in all instances are nickel steels containing a relatively large proportion of nickel, i. e., from about 27% to about 40%; (2) that all are relatively low in carbon, silicon and manganese and other common impurities; (3) that in all instances the low expanding sides contain substantial proportions of cobalt, say 10–18%; (4) that in the case of bimetal A (in which both sides contain cobalt) the cobalt content of the low side is several times that of the high side; (5) that bimetal A (which is superior to the others in its ability to retain its elasticity during long exposure to elevated temperatures) is characterized by substantial molybdenum contents (of the order of 1%) in both high and low sides; and (6) that in the preferred bimetal A the nickel content of both sides is of the order of 30%. Bearing these principles in mind a great number of other bimetal combinations may be constructed in accordance with my invention.

As shown on Fig. 4, the temperature at which zero deflection is obtained with the nickel steel bimetals of my invention may be varied over a wide range. Thus, bimetal D deflects negatively to a slight degree below about 270° F., at which temperature it attains zero deflection, (see curve D¹) whereas bimetal C has a negative deflection until it attains a temperature of about 550° F. (curve C¹). Bimetals A and B attain zero deflections at intermediate temperatures—340° F., in the case of bimetal A and 300° F. in the case of bimetal B.

These variations in the temperature at which zero deflection is attained are obtained by regulating the nickel and cobalt contents of the sides of the bimetal. Thus, the point of zero deflection of the bimetal C is advanced to 550° C. as the result of a high nickel content (39.39%) in the high expanding side as compared with nickel and 11.72% cobalt in the low expanding side. Other factors being equal, the temperature of zero deflection of a nickel steel bimetal made in accordance with my invention may be increased, within limits, by increasing the nickel or cobalt content of either.

The preferred temperature operating range for a bimetal of my invention begins, in general, a small amount, say 50° F., above the temperature at which the deflection curve for the bimetal passes through the point of zero deflection (the point at which deflection changes from negative to positive) and extends upwardly as far as the deflection curve continues to have a sharp positive slope. With bimetals A, B, C and D the preferred temperature operating ranges are approximately as follows:

| Bimetal | Range |
|---|---|
| | °F |
| A | 400–800 |
| B | 350–650 |
| C | 600–750 |
| D | 320–900 |

In the preferred operating range, the bimetal has its maximum flexivity and hence has its highest thermal responsiveness.

I claim:
1. A bimetal comprising two metal members that expand at different rates upon heating, the expansion of the first of said members being slightly less than the expansion of the second member at relatively low temperatures, substantially greater than the expansion of the second member at relatively elevated temperatures and substantially the same as the expansion of the second member at an intermediate temperature, whereby the bimetal first deflects slightly in one direction at the relatively low temperatures, becomes undeflected at the intermediate temperature, and deflects sharply in the opposite direction at the relatively elevated temperatures, both members being low-expanding nickel steels containing of the order of 27% to 40% nickel and from about 0.9% to about 3% molybdenum, the second member having a cobalt content ranging from about 10% to about 18%, and the first member having a cobalt content less than about 2%, the balance of both members being substantially iron.

2. A bimetal comprising two low-expanding nickel steel elements each containing from 27% to 33% nickel and that expand at different rates upon heating, the expansion of the first of said members being slightly less than the expansion of the second member at relatively low temperatures, substantially greater than the expansion of the second member at relatively elevated temperatures and substantially the same as the expansion of the second member at an intermediate temperature, both members containing molybdenum in proportions of about 0.9% to 1.1%, the second and first members containing cobalt in proportions respectively of the order of 10% to 18% and of about 1%, the balance of both members being substantially iron.

3. A bimetal comprising two low-expanding steel members each containing about 31.7% to 32.3% nickel and about 0.9% to 1.1% molybdenum, the first member having a cobalt content of about 0.9% to 1.1% and the second member having a cobalt content of about 14% to 15.3%, the balance of both members being substantially iron with the expansion of the first member slightly less than the expansion of the second member at relatively low temperatures, substantially greater than the expansion of the second member at relatively elevated temperatures and substantially the same as the expansion of the second member at an intermediate temperature.

ROMAINE GEORGE WALTENBERG.